(12) United States Patent
Oxley

(10) Patent No.: US 9,046,116 B2
(45) Date of Patent: Jun. 2, 2015

(54) CONNECTION ARRANGEMENT

(75) Inventor: Stewart James Oxley, Derby (GB)

(73) Assignee: ASG GROUP LTD., Derby (GB)

( * ) Notice: Subject to any disclaimer, the term of this patent is extended or adjusted under 35 U.S.C. 154(b) by 208 days.

(21) Appl. No.: 13/805,600

(22) PCT Filed: Jun. 21, 2011

(86) PCT No.: PCT/GB2011/000927
§ 371 (c)(1),
(2), (4) Date: Apr. 2, 2013

(87) PCT Pub. No.: WO2011/161403
PCT Pub. Date: Dec. 29, 2011

(65) Prior Publication Data
US 2013/0183081 A1 Jul. 18, 2013

(30) Foreign Application Priority Data

Jun. 25, 2010 (GB) .................................. 1010680.5

(51) Int. Cl.
*B62K 21/12* (2006.01)
*F16B 7/04* (2006.01)
*F16B 7/18* (2006.01)

(52) U.S. Cl.
CPC ......... *F16B 7/0453* (2013.01); *Y10T 403/4309* (2015.01); *F16B 7/0446* (2013.01); *F16B 7/18* (2013.01)

(58) Field of Classification Search
CPC ........ F16B 7/0446; F16B 7/0453; F16B 7/18; A47B 3/06
USPC .......................... 403/207, 208, 213, 345–347; 256/65.02, 65.03, 65.05, 65.06, 65.12
See application file for complete search history.

(56) References Cited

U.S. PATENT DOCUMENTS

| RE26,539 E | * | 3/1969 | Bott | 224/321 |
| 4,846,600 A | * | 7/1989 | Strand | 403/260 |
| 4,915,535 A | * | 4/1990 | Willetts | 403/191 |
| 4,923,322 A | * | 5/1990 | Burg | 403/234 |
| 5,078,309 A | | 1/1992 | Hull et al. | |
| 5,928,395 A | * | 7/1999 | Glen et al. | 55/378 |
| 6,203,233 B1 | * | 3/2001 | Stanley | 403/28 |
| 6,227,752 B1 | * | 5/2001 | Friedrich | 403/192 |

FOREIGN PATENT DOCUMENTS

| GB | 897382 A | 5/1962 |
| GB | 2205379 A | 12/1988 |
| WO | 2007/115598 A1 | 10/2007 |

OTHER PUBLICATIONS

International Search Report and Written Opinion issued Sep. 27, 2011 in PCT patent application No. PCT/GB2011/000927.

* cited by examiner

*Primary Examiner* — Michael P Ferguson
*Assistant Examiner* — Nahid Amiri
(74) *Attorney, Agent, or Firm* — Pearne & Gordon LLP

(57) ABSTRACT

A connection arrangement (10) for connecting perpendicular first and second tubular members (12, 14). The arrangement (10) including coaxial circular and larger square openings (20, 22) provided on opposite faces of the tubular member (12). A circular opening (24) is provided in the second tubular member (14) alignable with the openings (26, 28) further openings are provided in the member 14 on either side of the opening to receive a face of the first member (12) when abutting against the second member (14). A nut (36) is trapped behind the opening (24), and a bolt (38) can extend through the two openings (20, 22) in the first member to engage with the bolt (38) to retain the members (12, 14) together.

11 Claims, 15 Drawing Sheets

CONNECTION ARRANGEMENT

BACKGROUND OF THE INVENTION

This invention concerns a connection arrangement, and particularly but not exclusively an arrangement for connecting together first and second tubular members, with the tubular members each extending in a respective adjacent plane.

In a number of instances it is necessary to connect rounded tubular members which extend in adjacent planes, which planes may be parallel to each other. One such example is in a dog guard for a vehicle where it may be required to mount one or more bracing members at least generally perpendicular to a main frame, which bracing members can engage against a C pillar in the vehicle. Currently such an arrangement often requires the mounting of a plate or other element to for instance the frame to ensure that a good connection can be made which does not allow pivotal movement between the respective components.

BRIEF SUMMARY OF THE INVENTION

In this specification the expression "rounded tubular member" is to be understood as meaning a tubular member in which the transition between perpendicular sides on the tube is provided by a curved surface. Such tubular members may be cylindrical, or could for instance have two semicircular section end walls joined by flat side walls.

According to the present invention there is provided a connection arrangement, for connecting together first and second tubular members, with each tubular member in a respective adjacent plane, the arrangement including on an outer face of a first tubular member which faces away from the second tubular member a first opening through which a fastening member can engageably extend, a second opening being provided on the inner face of the first tubular member opposite the first opening, the second opening being larger than the first opening, and being at least generally rectangular, a third opening being provided in an inner face of the second tubular member facing the first tubular member, which third opening is alignable with the first and second openings to engagingly receive the fastening member, and fourth and fifth openings in the inner face of the second tubular member located either side of a mounting part of the second tubular member, which mounting part locates the third opening, the fourth and fifth openings on either side of the mounting part having at least generally straight sides such that the mounting part can be slidingly received in the second opening, whilst the opposite sides of the fourth and fifth openings are curved so as to each receive a respective curved surface of the first tubular member engaging thereagainst.

The opposite sides of the fourth and fifth openings may be curved so as to substantially correspond in profile to the curved surfaces of the first tubular member when said surfaces are engaging in said openings.

The opposite sides of the fourth and fifth openings may be substantially arcuate.

The second opening may be substantially square. The second tubular member may be substantially cylindrical.

In one embodiment a female fastening member is provided within the second tubular member, with which female fastening member a male fastening member is engageable.

The female fastening member may be in the form of a trapped nut, which may be a rivet nut.

In a second embodiment a sixth opening is provided in the second tubular member, which sixth opening is coaxial with and diametrically opposite the third opening, and a male fastening member extends through both the third and sixth openings, and is engageable with a female fastening member on the outside of the first tubular member.

The first and second tubular members may extend perpendicularly to each other.

Some or all of the openings in the tubular members may be formed by laser cutting.

The male fastening member may be in the form of a thumb screw to permit tightening by hand.

BRIEF DESCRIPTION OF THE DRAWINGS

Embodiments of the present invention will now be described by way of example only and with reference to the accompanying drawings, in which.

DETAILED DESCRIPTION OF A PREFERRED EMBODIMENT

Figure 1:
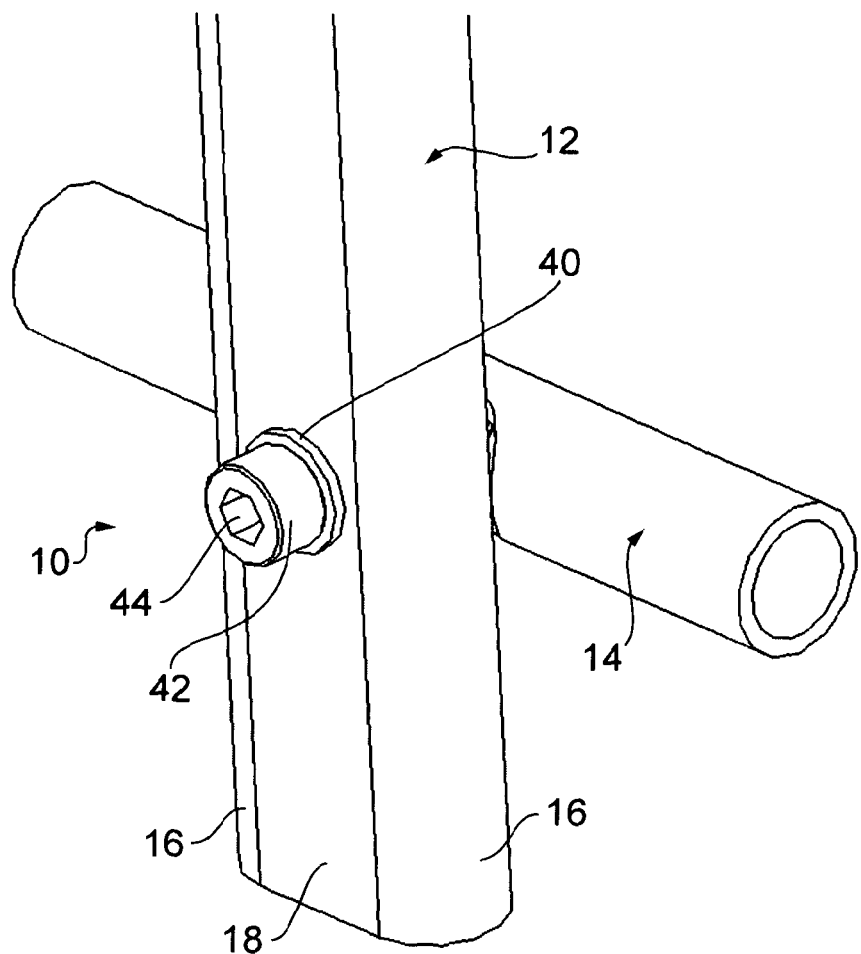
FIG. 1 is a diagrammatic front perspective view of a first connection arrangement according to the invention.
Figure 2:
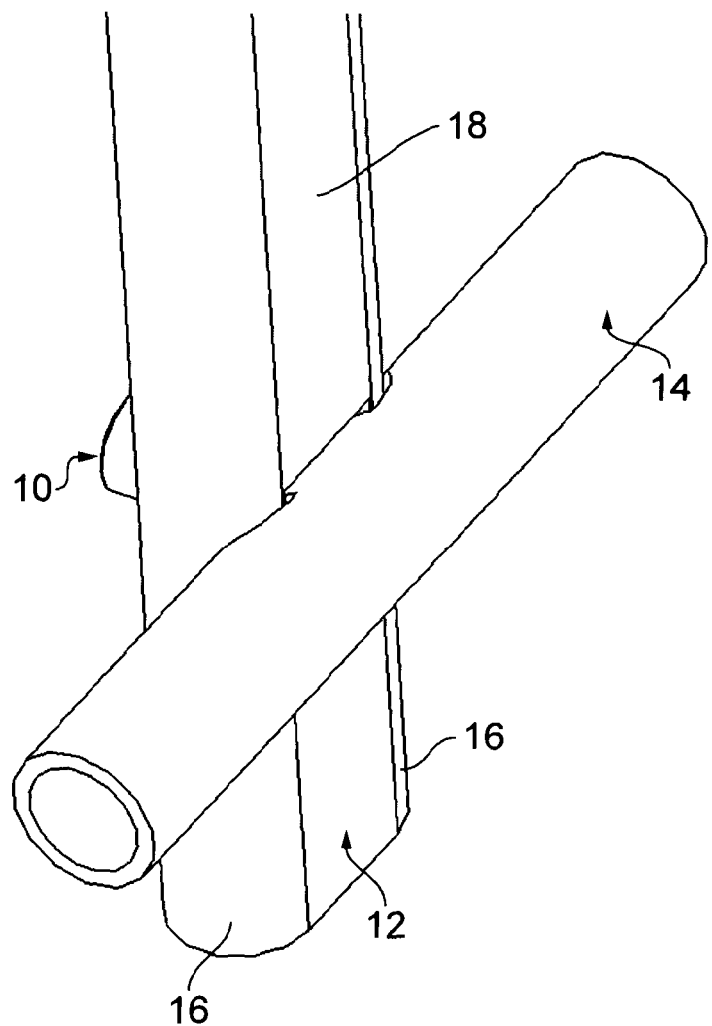
FIG. 2 is a diagrammatic rear perspective view of the arrangement of FIG. 1.
Figure 3:
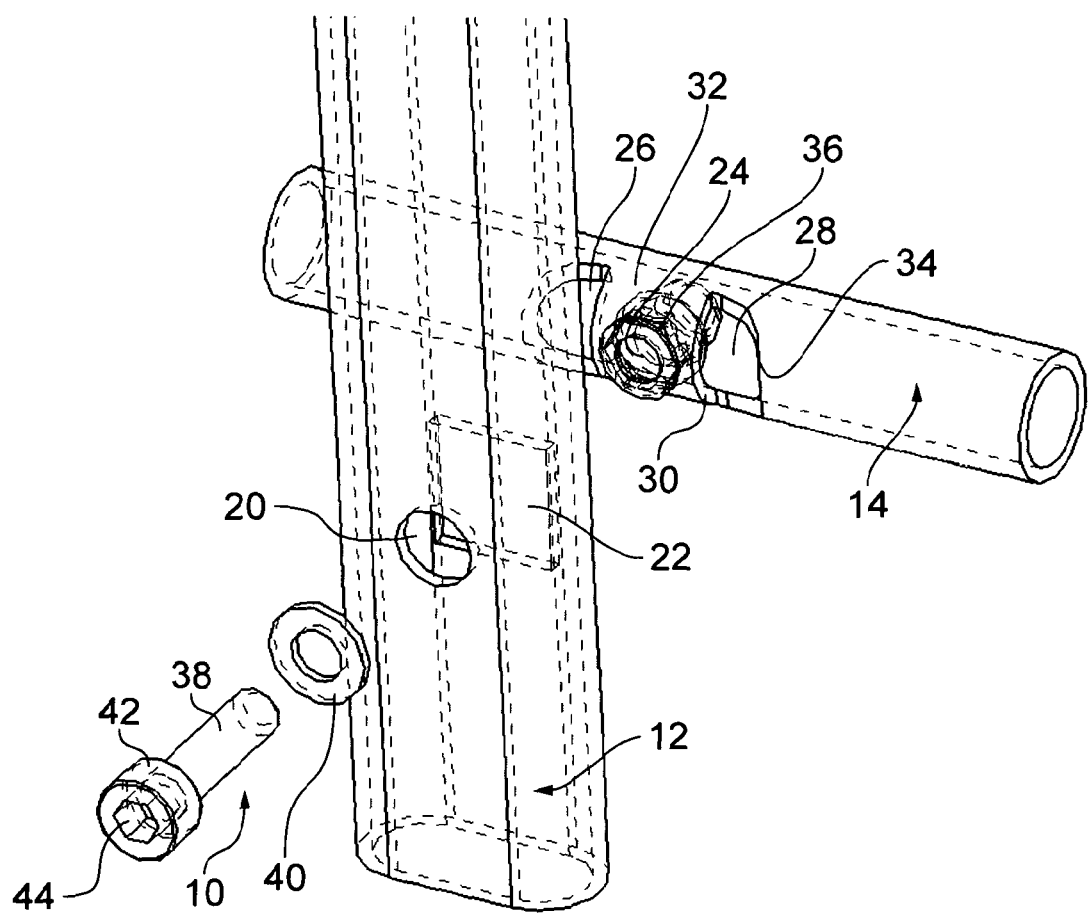
FIG. 3 is an exploded diagrammatic hollow front perspective view of the arrangement of FIG. 1.
Figure 4:
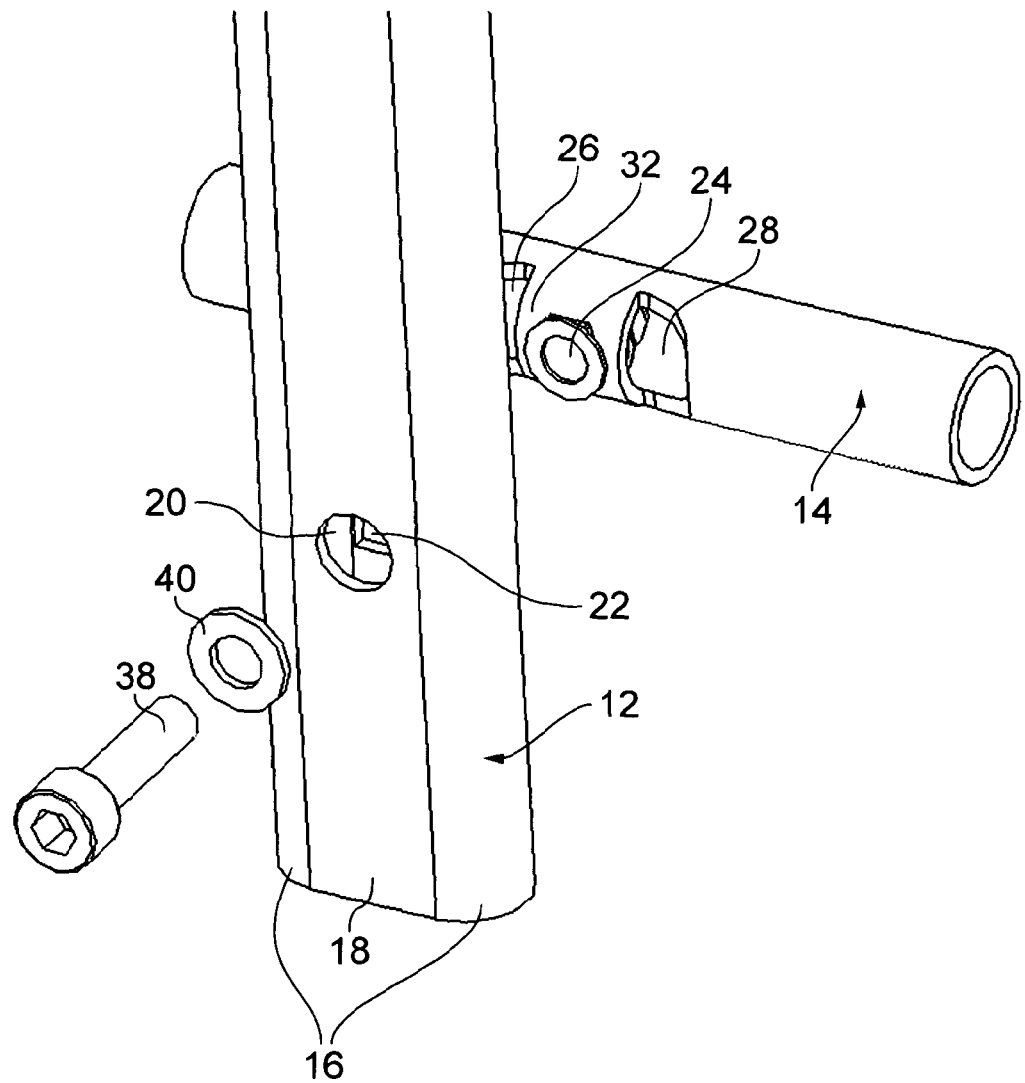
FIG. 4 is an exploded diagrammatic front perspective view of the arrangement of FIG. 1.
Figure 5:
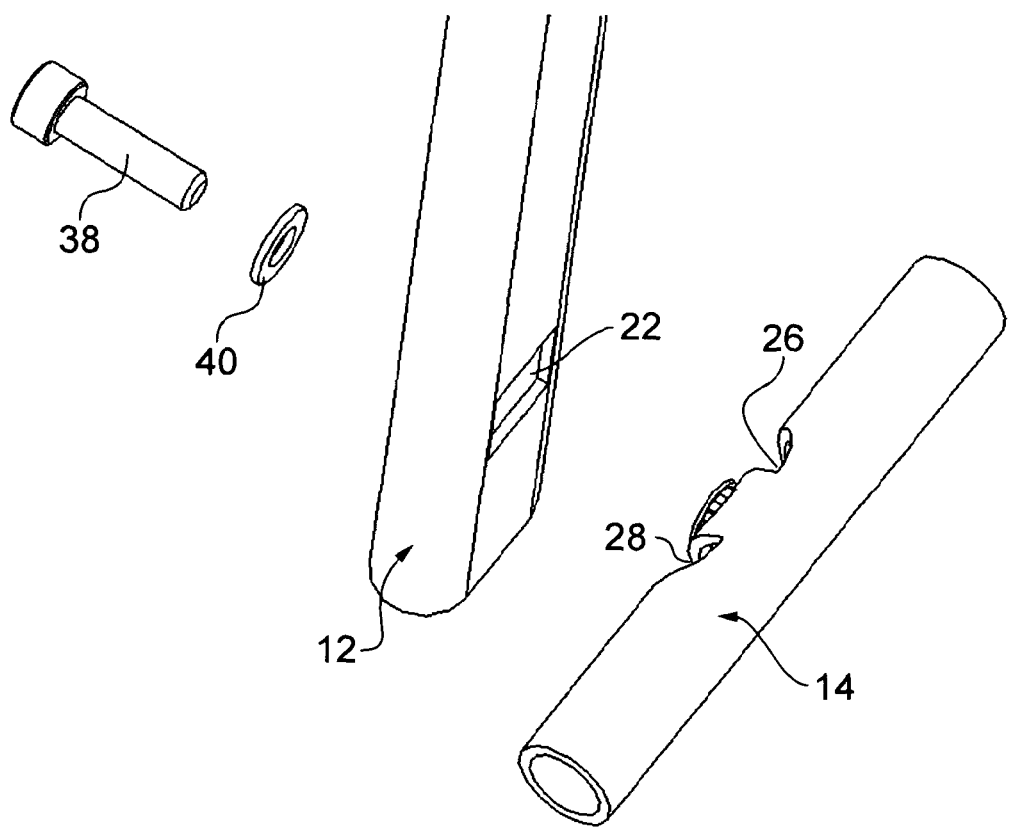
FIG. 5 is a diagrammatic exploded rear view of the arrangement of FIG. 1.
Figure 6:
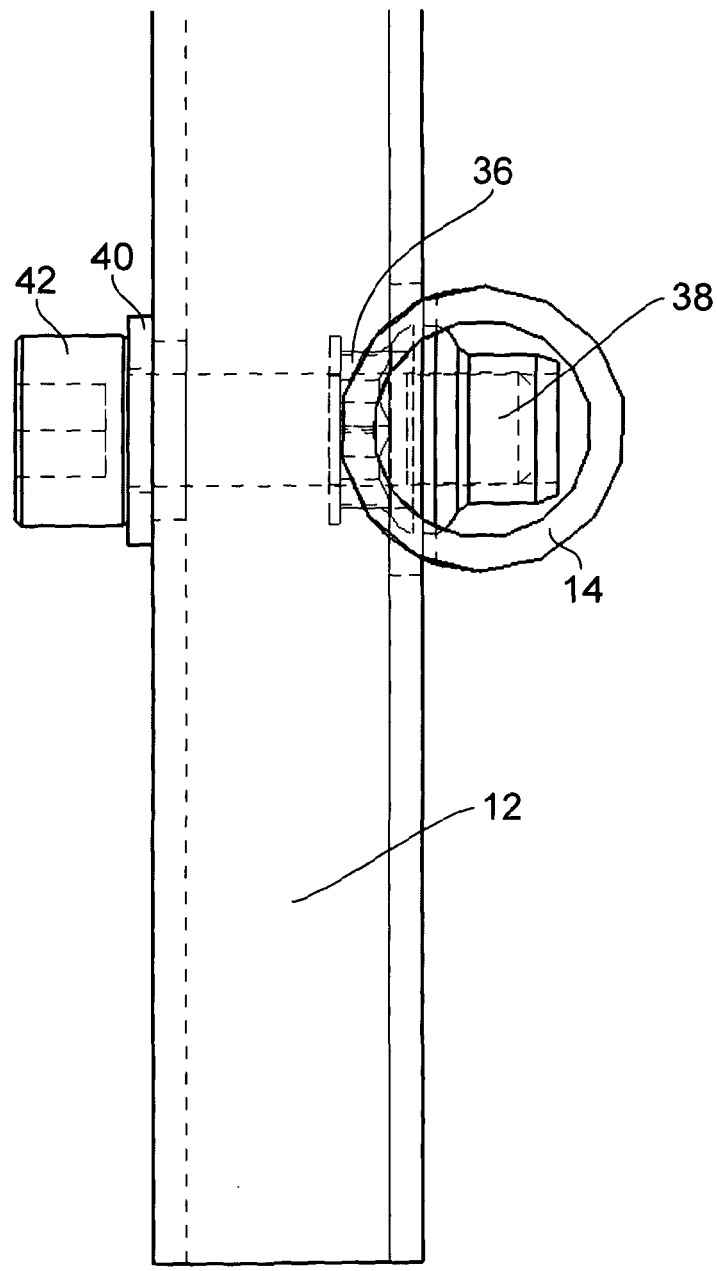
FIG. 6 is diagrammatic hollow side view of the arrangement of FIG. 1.
Figure 7:
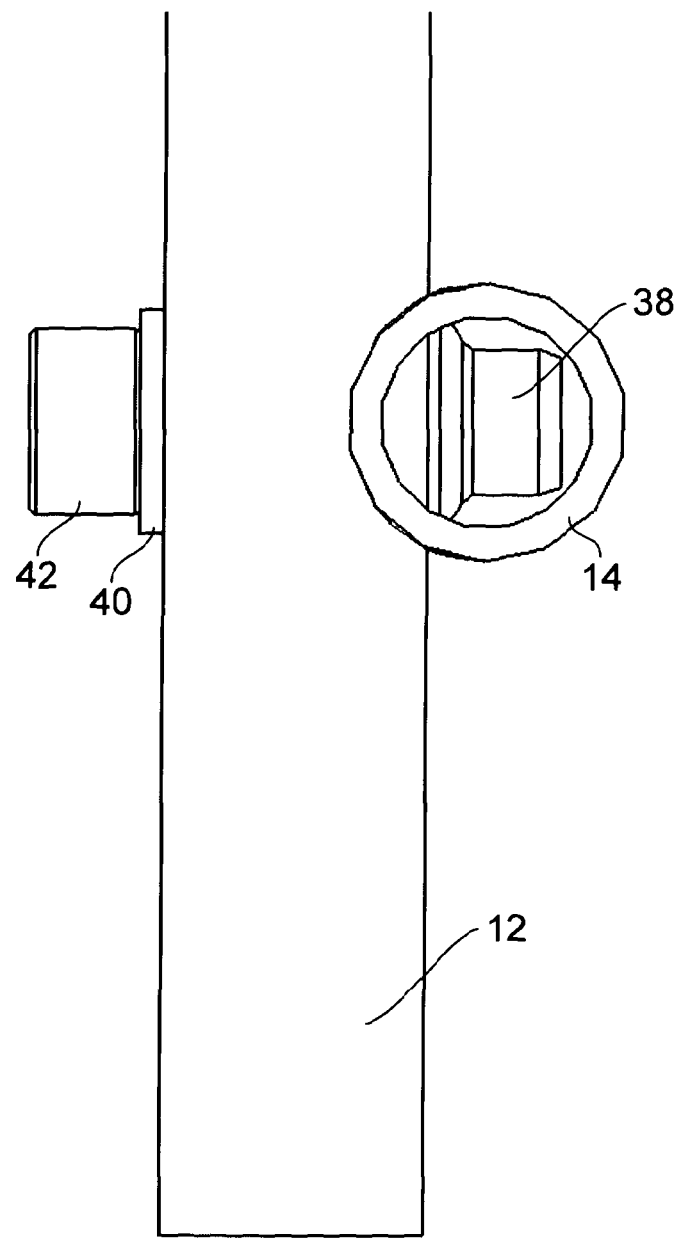
FIG. 7 is diagrammatic side view of the arrangement of FIG. 1.
Figure 8:
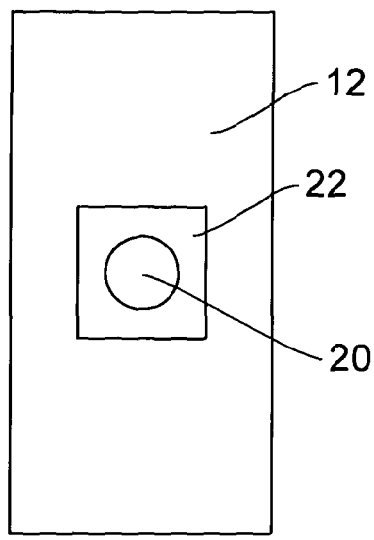
FIG. 8 is a diagrammatic view of part of the arrangement of FIG. 1.
Figure 9:
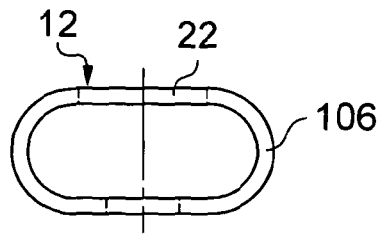
FIG. 9 is diagrammatic cross-sectional plan view of a further part of the arrangement of FIG. 1.
Figure 10:
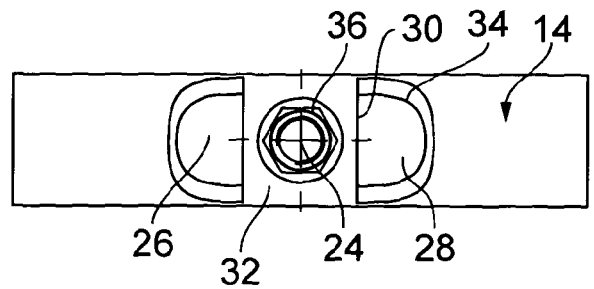
FIG. 10 is a diagrammatic front view of a still further part of the arrangement of FIG. 1.
Figure 11:
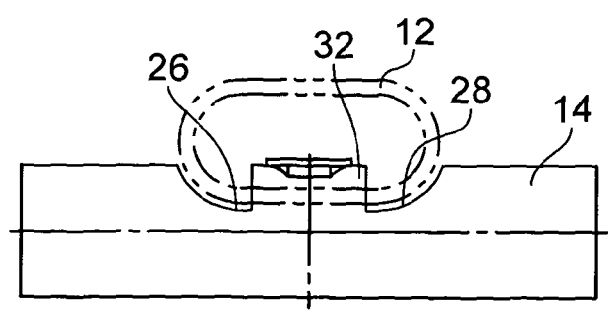
FIG. 11 is a diagrammatic plan view of some of the components of the arrangement of FIG. 1.
Figure 12:
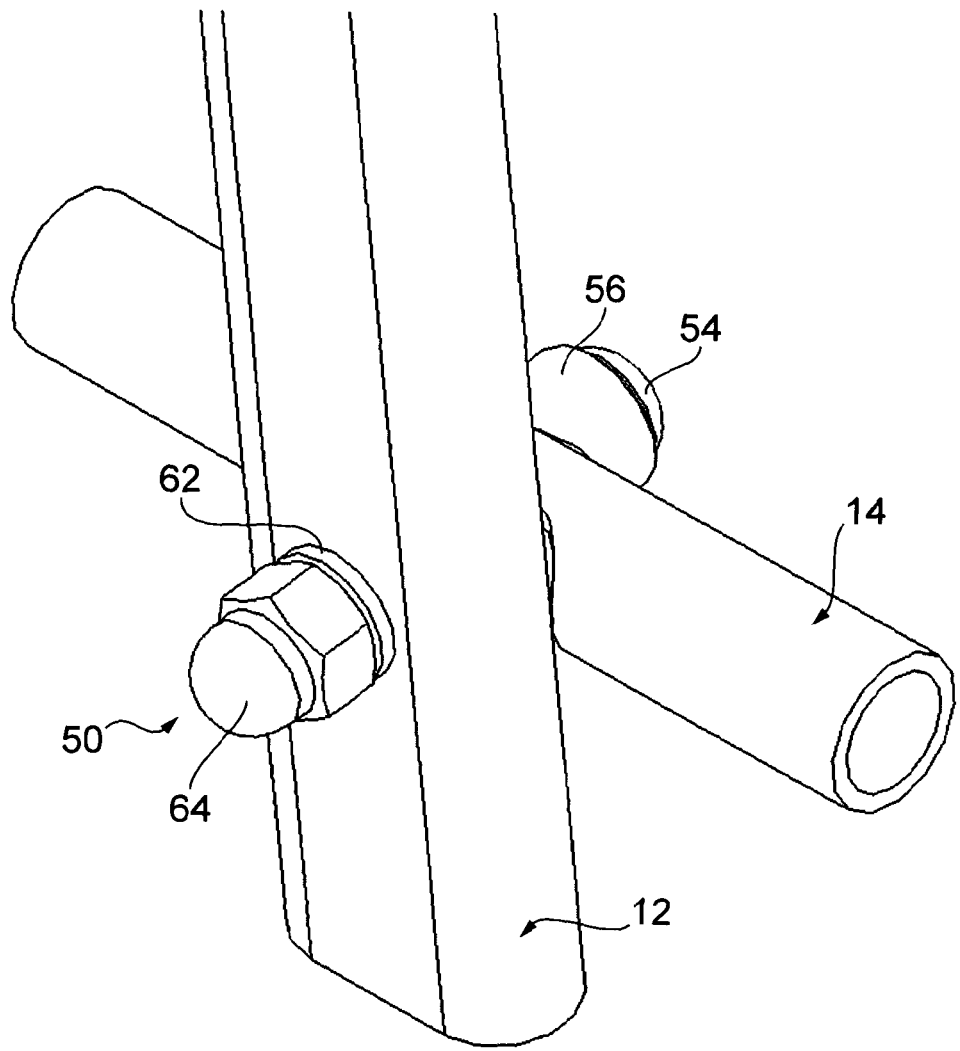
FIG. 12 is a similar view to FIG. 1 of a second connection arrangement according to the invention.
Figure 13:
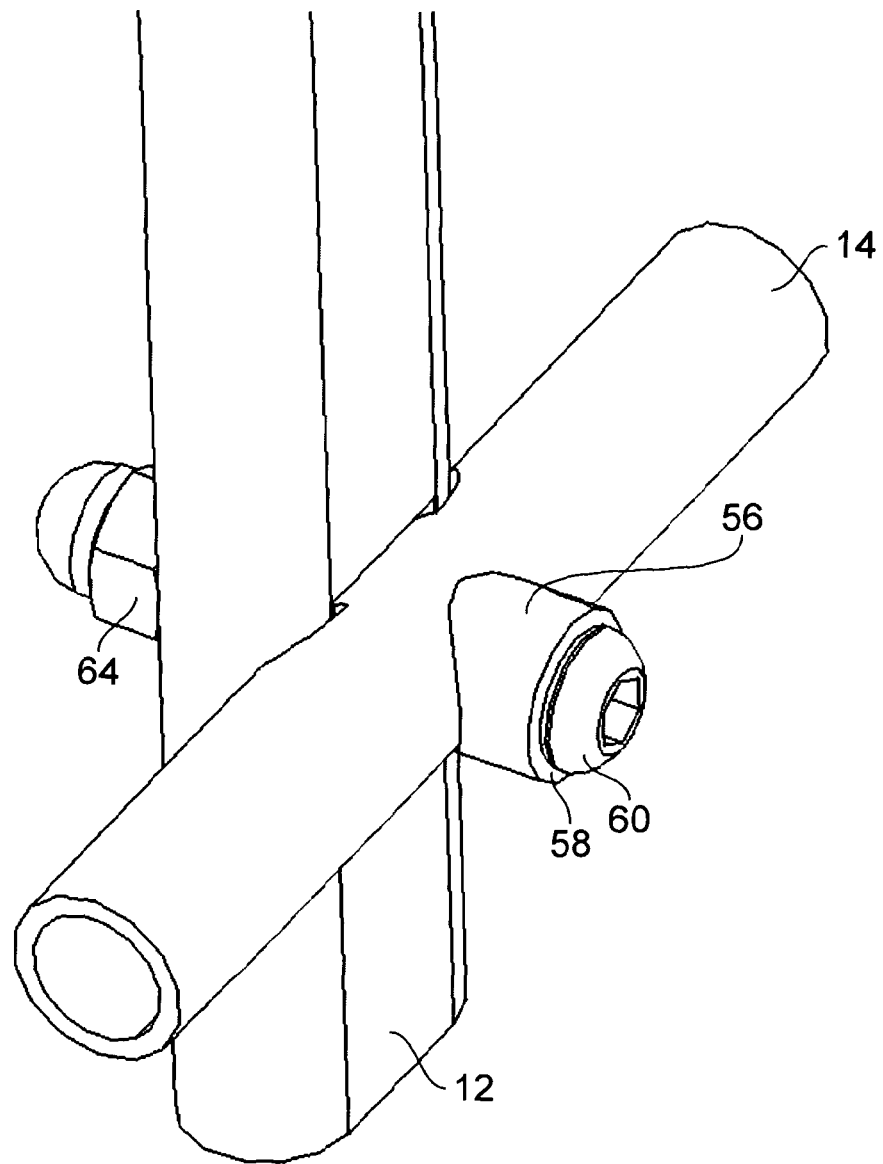
FIG. 13 is a similar view to FIG. 2 of the arrangement of FIG. 12.
Figure 14:
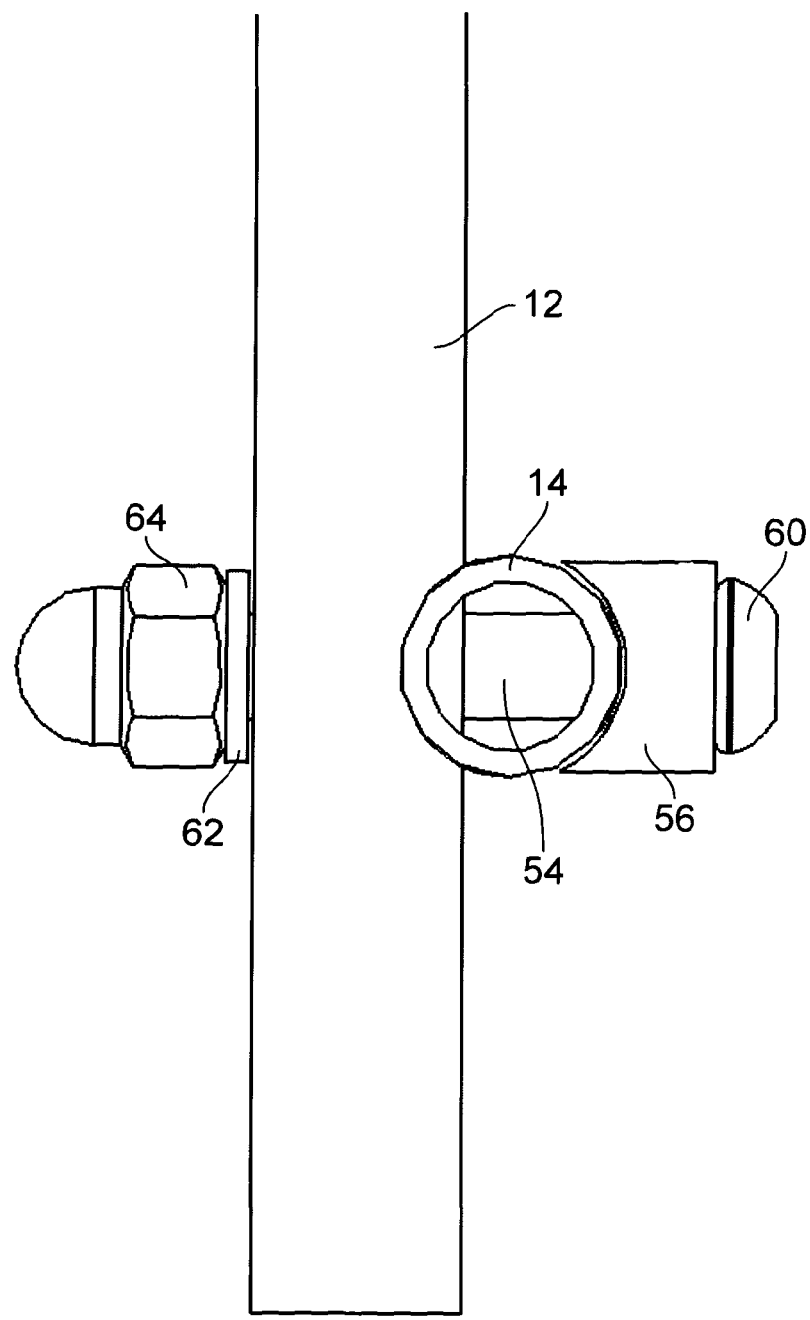
FIG. 14 is a similar view to FIG. 7 of the arrangement of FIG. 12.
Figure 15:
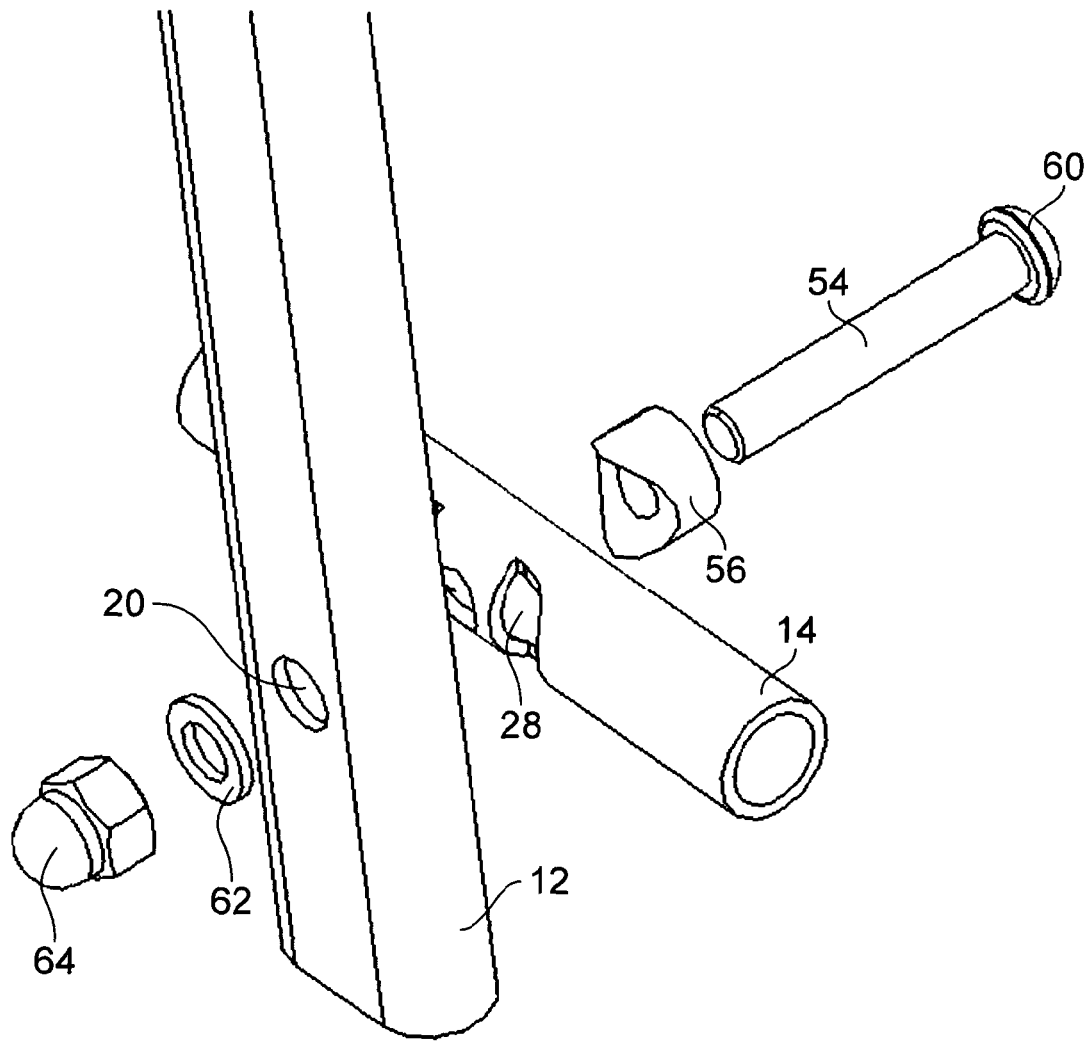
FIG. 15 is a similar view to FIG. 4 of the arrangement of FIG. 12.
Figure 16:
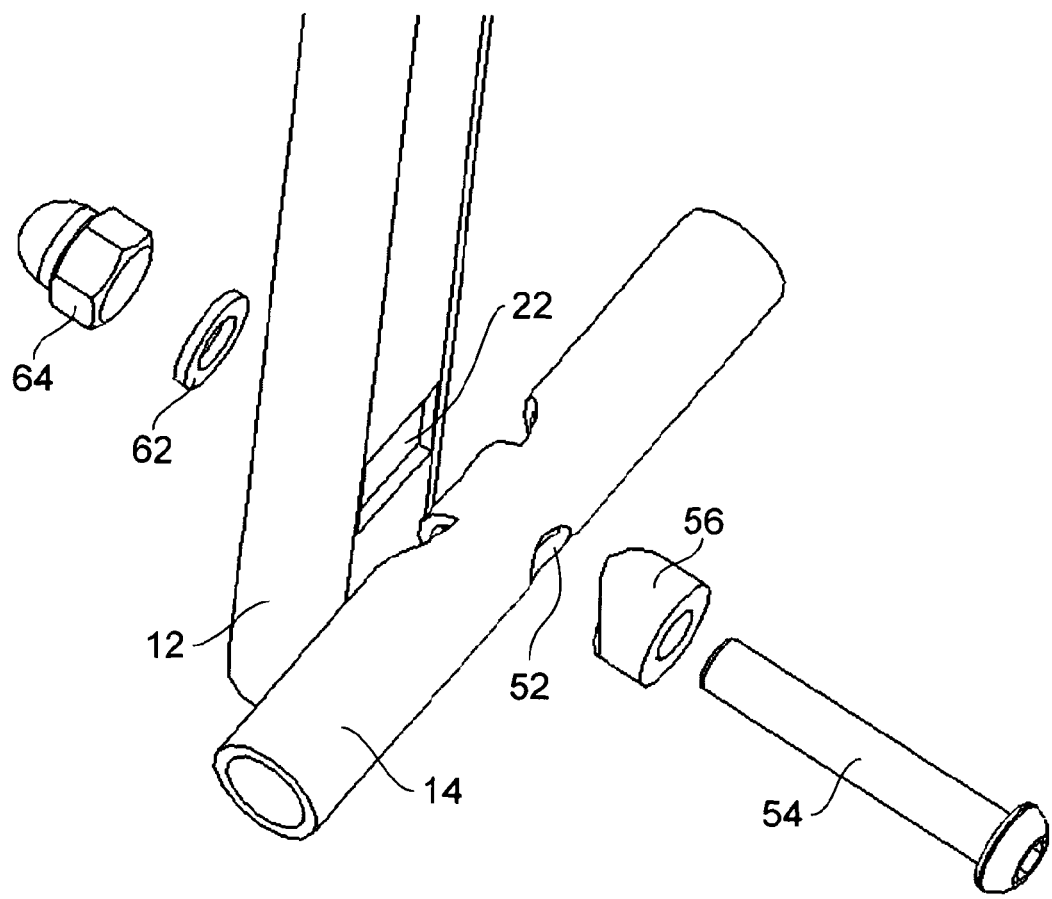
FIG. 16 is a similar view to FIG. 5 of the arrangement of FIG. 12.
Figure 17:
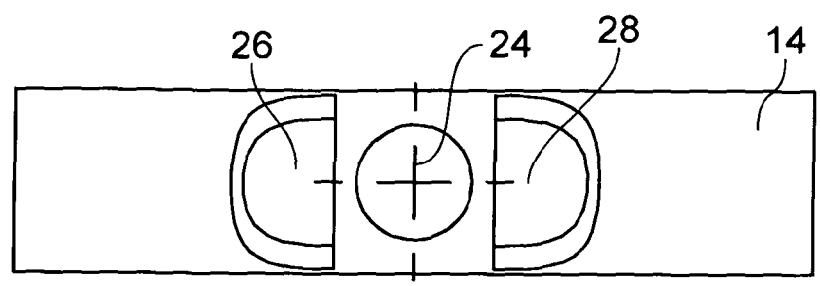
FIG. 17 is a similar view to FIG. 10 of the arrangement of FIG. 12.
Figure 18:
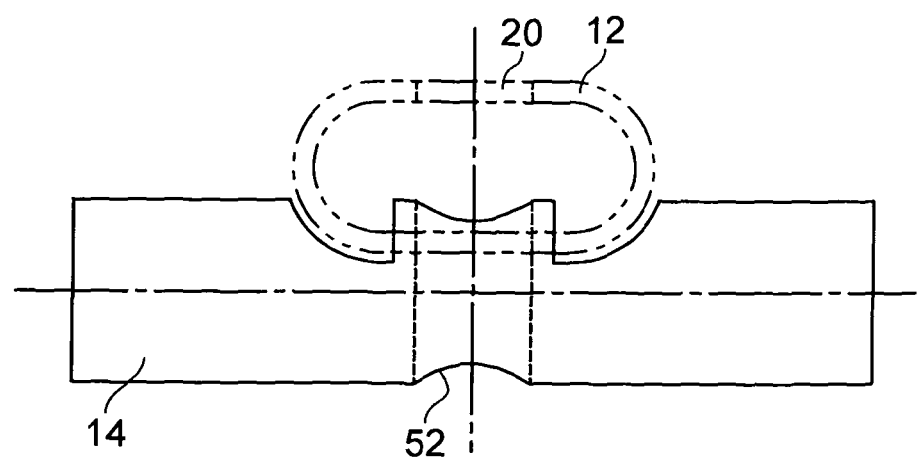
FIG. 18 is a similar view to FIG. 11 of the arrangement of FIG. 12.

FIGS. 1 to 11 show a first connection arrangement 10. The arrangement 10 is connecting a first tubular member 12 to a perpendicular second tubular member 14. The first tubular member has semicircular end walls 16 interconnected by straight side faces 18. The second tubular member 14 is cylindrical. A first circular opening 20 is provided in the front side face 18, with a larger coaxial square second opening 22 provided in the rear side face 18.

A third circular opening 24 of a similar size to the first opening 20 is provided in a front face of the second tubular member 14. Fourth and fifth openings 26, 28 are provided spaced on either side of the third opening 24 in the second tubular member 14. The fourth and fifth openings 26, 28 have straight edges 30 on either side of the third opening 24 to define a mounting part 32 therebetween, which mounting part 32 includes the third opening 24. The mounting part 32 is of a size to slidingly locate in the second opening 22.

The fourth and fifth openings 26, 28 have curved outer edges 34 opposite the straight edges 32. The outer edges 34 are curved such that the respective curved end walls 16 of the first tubular member 12 can be received in the respective openings 26, 28 with the end walls 16 substantially fully engaging against the outer edges 34.

A nut 36 is trapped in the second tubular member 14 immediately behind and coaxial with the third opening 24. The nut 36 may be in the form a rivet nut which can be mounted therein by a riveting configuration using an appropriate tool. A bolt 38 is extendable through the first, second and third openings 20, 22, 24 to engage with the nut 36 to hold the first and second tubular members 12, 14 together. A washer 40 is provided on the bolt 38 adjacent a head 42 of the bolt, which head 42 has a hexagonal opening 44 therein to receive an appropriate tool.

The arrangement 10 therefore permits the first and second tubular members to be rigidly connected together by a single bolt 38, with the shape of the openings 22, 24, 26, 28 providing for close engagement between the first and second tubular members 12, 14 to prevent relative pivoting or other movement therebetween. The arrangement 10 provides for a visually neat arrangement with only the bolt head 42 and washer 40 extending from the first tubular member 12.

FIGS. 12 to 18 show a second connection arrangement 50 which is similar to the first connection arrangement 10, and only the differences will therefore be described. In this instance no trapped nut is provided, but rather a sixth opening 52 is provided on the rear side of the second tubular member 14. A bolt 54 is again provided, but in this instance the bolt 54 extends from the rear side of the second tubular member 14 through the sixth opening 52. A profiled washer 56 is provided on the rear of the second tubular member 14 to engage against the curved surface thereof and provide a flat face 58 for the head 60 of the bolt 54 to engage against.

The bolt 54 extends through the third opening 24, second opening 22 and first opening 20. A washer 62 is provided around the distal end of the bolt 54, and the bolt 54 is engageable with a nut 64 on the front side of the first tubular member 12 to retain the second connection arrangement 50 together, and provide a firm connection between the first and second tubular members 12, 14.

Figure 19:
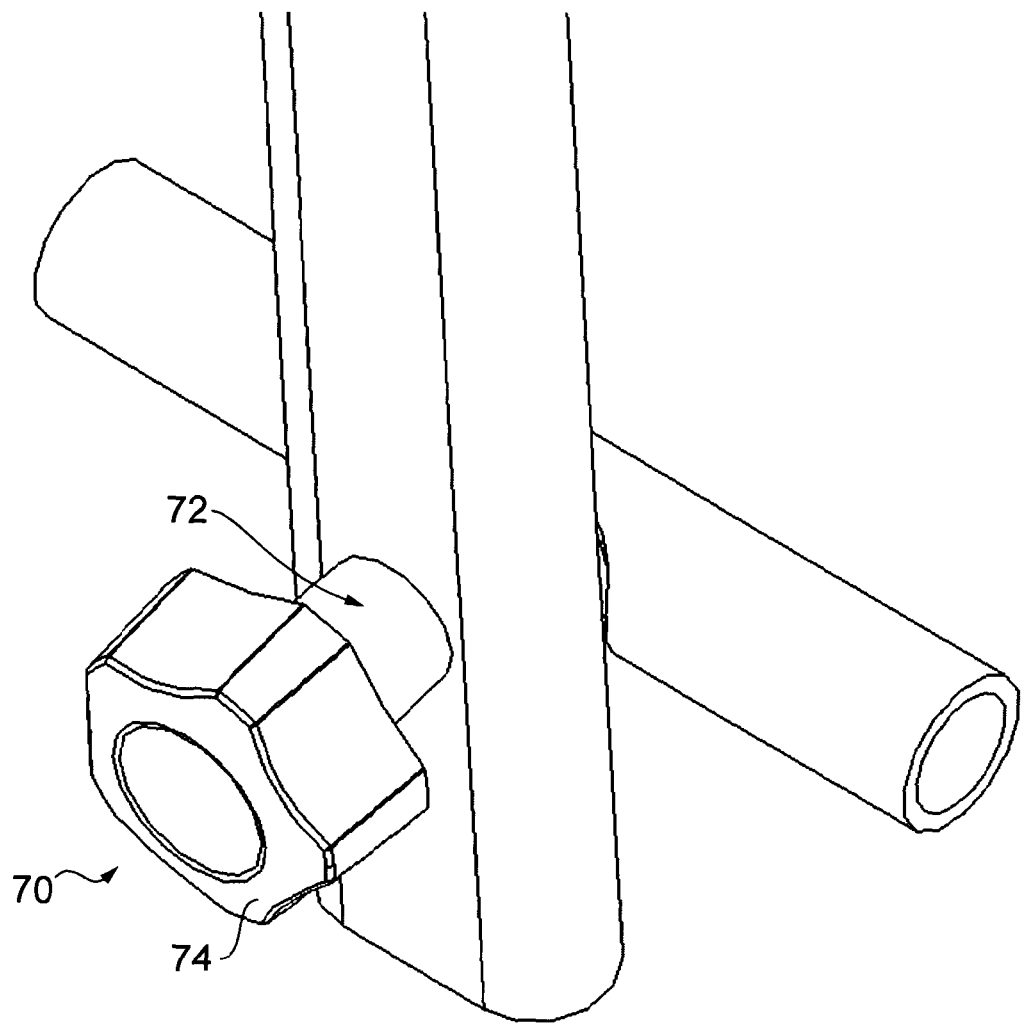
FIG. 19 is a similar view to FIG. 1 of a third connection arrangement according to the invention.

FIG. 19 shows a third connection arrangement 70 which is similar to the first connection arrangement 10, except that a thumb screw 72 is provided with an enlarged head 74 which is manually engageable to permit the screw 72 to be tightened by hand without the requirement for any tools.

Various other modifications may be made without departing from the scope of the invention. For example, the different openings may have different shapes. Arrangements could be provided for connecting different shape tubes, and for example both tubes could be cylindrical or both tubes could have flat side faces or other curved profiles. Different fastening means may be used.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether, or not particular emphasis has been placed thereon.

The invention claimed is:

1. A connection arrangement, comprising first and second tubular members, wherein each tubular member is in a respective adjacent plane, the first tubular member having curved end walls extending longitudinally along of the first tubular member and spaced apart by inner and outer faces of the first tubular member, a first opening in said outer face of the first tubular member effectively sized to receive a male fastening member therethrough, a second opening being provided on the inner face of the first tubular member opposite the first opening, the second opening larger than the first opening, and being at least generally rectangular, a third opening being provided in an inner face of the second tubular member facing the first tubular member, which third opening is alignable with the first and second openings to engagingly receive the male fastening member, and fourth and fifth openings in the inner face of the second tubular member located on opposing sides of a mounting part of the second tubular member that is defined between said fourth and fifth openings, which mounting part comprises the third opening therein, wherein sides of the fourth and fifth openings adjacent and defining said mounting part being at least generally straight sides such that the mounting part is adapted to be slidingly received in the second opening, whilst the respective opposite sides of the fourth and fifth openings are curved so as to each receive a respective curved end wall of the first tubular member engaging thereagainst.

2. A connection arrangement according to claim 1, in which the opposite sides of the fourth and fifth openings are curved so as to substantially correspond in profile to the curved end walls of the first tubular member when said surfaces are engaging in said openings.

3. A connection arrangement according to claim 1, in which the second opening is substantially square.

4. A connection arrangement according to claim 1, in which the second tubular member is substantially cylindrical.

5. A connection arrangement according to claim 4, in which the male fastening member is in the form of a thumb screw to permit tightening by hand.

6. A connection arrangement according to claim 1, in which a female fastening member is provided within the second tubular member, with which the female fastening member is adapted to engage a male fastening member.

7. A connection arrangement according to claim 6, in which the female fastening member is in the form of a trapped nut.

8. A connection arrangement according to claim 7, in which the female fastening member is in the form of a rivet nut.

9. A connection arrangement according to claim 1, in which a sixth opening is provided in the second tubular member, which sixth opening is coaxial with and diametrically opposite the third opening, and the male fastening member extends through both the third and sixth openings, and is adapted to engage with a female fastening member on the outside of the first tubular member.

10. A connection arrangement according to claim 1, in which the first and second tubular members extend perpendicularly to each other.

11. A connection arrangement according to claim 1, in which some of all of the openings in the tubular members are formed by laser cutting.

* * * * *